United States Patent
Carter et al.

(10) Patent No.: US 9,934,079 B2
(45) Date of Patent: *Apr. 3, 2018

(54) FAST REMOTE COMMUNICATION AND COMPUTATION BETWEEN PROCESSORS USING STORE AND LOAD OPERATIONS ON DIRECT CORE-TO-CORE MEMORY

(75) Inventors: John Bruce Carter, Austin, TX (US); Elmootazbellah Nabil Elnozahy, Austin, TX (US); Ahmed Gheith, Austin, TX (US); Eric Van Hansbergen, Austin, TX (US); Karthick Rajamani, Austin, TX (US); William Evan Speight, Austin, TX (US); Lixin Zhang, Austin, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1018 days.

This patent is subject to a terminal disclaimer.

(21) Appl. No.: 12/789,082

(22) Filed: May 27, 2010

(65) Prior Publication Data
US 2011/0296138 A1    Dec. 1, 2011

(51) Int. Cl.
*G06F 15/00* (2006.01)
*G06F 15/76* (2006.01)
*G06F 9/54* (2006.01)

(52) U.S. Cl.
CPC .................... *G06F 9/544* (2013.01)

(58) Field of Classification Search
USPC .......................................... 712/29
See application file for complete search history.

(56) References Cited

U.S. PATENT DOCUMENTS

| | | | |
|---|---|---|---|
| 6,446,137 B1 | 9/2002 | Vasudevan et al. | |
| 6,487,607 B1 | 11/2002 | Wollrath et al. | |
| 6,751,799 B2 | 6/2004 | Kays, Jr. et al. | |
| 6,904,601 B1 | 6/2005 | Blasiak et al. | |
| 7,315,897 B1 * | 1/2008 | Hardee et al. | 709/229 |

(Continued)

FOREIGN PATENT DOCUMENTS

| | | |
|---|---|---|
| CN | 102077181 A | 5/2011 |
| DE | 60111551 T2 | 5/2006 |

(Continued)

OTHER PUBLICATIONS

Kranz et al. (Integrating Message-Passing and Shared-Memory: Early Experience, Jul. 1993, pp. 54-63).*

(Continued)

*Primary Examiner* — George Giroux
(74) *Attorney, Agent, or Firm* — Garg Law Firm, PLLC; Rakesh Garg; Mercedes L. Hobson (57) ABSTRACT

A system, and computer usable program product for fast remote communication and computation between processors are provided in the illustrative embodiments. A direct core to core communication unit (DCC) is configured to operate with a first processor, the first processor being a remote processor. A memory associated with the DCC receives a set of bytes, the set of bytes being sent from a second processor. An operation specified in the set of bytes is executed at the remote processor such that the operation is invoked without causing a software thread to execute.

21 Claims, 8 Drawing Sheets

(56) References Cited

U.S. PATENT DOCUMENTS

| | | |
|---|---|---|
| 7,464,115 B2 | 12/2008 | Carter et al. |
| 7,536,468 B2 | 5/2009 | Blackmore et al. |
| 7,624,250 B2 | 11/2009 | Lau et al. |
| 7,844,973 B1 * | 11/2010 | Dice .............................. 718/108 |
| 2003/0005071 A1 * | 1/2003 | Kanoh .......................... 709/213 |
| 2003/0084269 A1 | 5/2003 | Drysdale et al. |
| 2007/0180310 A1 | 8/2007 | Johnson et al. |
| 2007/0204130 A1 * | 8/2007 | Hass ....................... H04L 49/00 711/207 |
| 2008/0244231 A1 | 10/2008 | Kunze et al. |
| 2009/0199182 A1 * | 8/2009 | Arimilli .................. G06F 9/542 718/100 |
| 2010/0031267 A1 * | 2/2010 | Maessen ............... G06F 9/5066 718/105 |
| 2011/0047310 A1 | 2/2011 | Bonola |

FOREIGN PATENT DOCUMENTS

| | | |
|---|---|---|
| DE | 102008016178 A1 | 10/2008 |
| EP | 2271992 A1 | 1/2011 |
| WO | 2007092747 A2 | 8/2007 |
| WO | 2009134217 A1 | 11/2009 |

OTHER PUBLICATIONS

Wentzlaff, D. let al.]: On-Chip Interconnection Architecture of the Tile Processor. IEEE micro, vol. 27, 2007, No. 5, S. 15-31. IEEE Xplore [online]. DOI: 10.1109/MM.2007.4378780, In: IEEE.

Wentzlaff, D. et al.: On-Chip Interconnection Architecture of the Tile Processor. IEEE micro, vol. 27, 2007, No. 5, S. 15-31. IEEE Xplore [online]. DOI: 10.1109/MM.2007.4378780, In: IEEE.

IBM Corp; International search Authority, EP 2011/058582, May 25, 2011.

David Wentzlaff et al: "On-Chip 1-28 Interconnection Architecture of the Tile Processor", Sep. 1, 2007 (Sep. 1, 2007), IEEE Micro, IEEE Service Center, Los Alamitos, CA, US XPOII196754, ISSN: 0272-1732 pp. 15-31, p. 16, left-hand column p. 21, right-hand column p. 24-p. 25 p. 28, right-hand column.

Strong R et al: "Fast switching of threads between cores", Operating Systems Review, vol. 43, No. 2, Apr. 2009 (Apr. 2009), pp. 1-11, XP002653957, ACM USA ISSN: 0163-5980.

Patents Act 1977: Examination Report under Section—Application No. GB1222539.7, Jul. 5, 2017.

* cited by examiner

FIG. 1

DATA PROCESSING SYSTEM 100

FAST REMOTE COMMUNICATION AND COMPUTATION BETWEEN PROCESSORS USING STORE AND LOAD OPERATIONS ON DIRECT CORE-TO-CORE MEMORY

BACKGROUND OF THE INVENTION

1. Field of the Invention

The present invention relates generally to an improved data processing system, and in particular, to improving operations in a multiprocessor or multi-core data processing environment. Still more particularly, the present invention relates to system, and computer-usable program code for fast remote communication and computation between processors or processor cores in a multiprocessor or multi-core data processing environment.

2. Description of the Related Art

Data processing systems include processors for performing computations. A processor can include multiple processing cores. A core is a processor or a unit of a processor circuitry that is capable of operating as a separate processing unit. Some data processing systems can include multiple processors. A data processing environment can include data processing systems including single processors, multi-core processors, and multiprocessor configurations.

For the purposes of this disclosure, a data processing environment including multiple processors or processors with multiple cores is collectively referred to as a multiprocessor environment.

A thread is a stream of executable code within an application that can be executed on a processor. An application executing in a data processing system spawns threads that are executed by a processor in the data processing system. The implementation of threads and processes differs from one operating system to another, but in most cases, a thread is contained inside a process associated with the application. Multiple threads can exist within the same process and share resources such as memory.

A processor in a multiprocessor environment operates on data that can be referenced using an address space associated with a process executing on the processor. Such an address space is called a context. Thus, a processor performs computations within a context.

An effective address is a memory address as provided in an instruction that a processor executes. Generally, an effective address resolves to an address space of a memory accessible to the processor. A global address is an address that resolves to a global address space. A global address space is associated with a memory accessible to all processors in the data processing environment (hence global to the data processing environment). An effective address can be transformed into a global address under suitable configuration of memory in a multiprocessor data processing environment.

SUMMARY OF THE INVENTION

The illustrative embodiments provide a system, and computer usable program product for fast remote communication and computation between processors. An embodiment configures a direct core to core communication unit (DCC) to operate with a first processor, the first processor being a remote processor. The embodiment receives in a memory associated with the DCC a set of bytes, the set of bytes being sent from a second processor. The embodiment creates without software intervention a hardware execution context using data specified in the set of bytes at the remote processor. The embodiment executes an operation specified in the set of bytes at the remote processor within the created context.

In another embodiment, the set of bytes includes information about a context available at the remote processor within which the remote processor has to execute an instruction included in the set of bytes.

An embodiment further determines whether the set of bytes form a complete instruction. The execution occurs in response to the determining being positive.

In another embodiment, executing the set of bytes further loads the bytes using a load instruction at the remote processor for computation without requiring a first thread for reading the contents of the set of bytes and a second thread for executing the contents of the set of bytes.

In another embodiment, executing the set of bytes further loads the bytes using a load instruction at the remote processor for computation without requiring sending an interrupt to the remote processor.

Another embodiment further assess whether the set of bytes is in the first logical position in a FIFO queue in the memory. Execution occurs in response to the assessing being affirmative.

Another embodiment further assess whether the set of bytes is blocked from execution. Execution occurs in response to the assessing being negative.

In another embodiment, the set of bytes are sent by a thread executing on the second processor.

Another embodiment further composes, using the thread, the set of bytes. The embodiment writes the set of bytes directly to the memory of the DCC of the remote processor.

In another embodiment, the set of bytes are sent using a store instruction that permits the second processor to write directly to the memory of the DCC of the remote processor.

In another embodiment, the memory is a static random access memory (SRAM).

In another embodiment, the memory is configured to store several sets of bytes in a first-in first-out (FIFO) queue.

An embodiment further enables the second processor to write to the memory of the DCC of the remote processor. The embodiment configures the remote processor to allow the second processor to write to the memory of the DCC of the remote processor.

In another embodiment, arrival of the set of bytes in the memory triggers execution without an interrupt being sent to the remote processor.

BRIEF DESCRIPTION OF THE DRAWINGS

The novel features believed characteristic of the invention are set forth in the appended claims. The invention itself; however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

According to an embodiment of the invention, a multiprocessor or multi-core data processing environment can be configured such that a thread executing on one processor or core can perform operations using another processor or core. Presently, communications between processors are accomplished in many ways, including shared memory (SM), message passing (MP), remote procedure call (RPC), active message (AM), and active memory operation (AMO).

The invention recognizes that performing remote computations using a presently available method incurs substantial overhead cost in terms of computing resources. Remote computations are computations performed on one processor for the benefit of a thread executing on another processor. For example, an instruction that may only take four cycles to execute and perform the desired computation, may consume a thousand cycles by the time the procedure of an existing method for communication is complete.

The invention further recognizes that some of the overhead cost in remote communication and computations between processors arises from the cost of reading and writing to dynamic random access memory (DRAM) devices such as those used in general memory or main memory in present data processing systems. Initiating computation on the remote processor, such as through generating a hardware interrupt and scheduling a software thread, is also presently an expensive process. Additional overhead comes from reading and interpreting the contents of the message, whatever form they take. Recognizing, reaching, and retrieving data for such computations is also presently an expensive process. The invention recognizes that a hardware mechanism to enable a lower overhead cost remote operation may be desirable.

The illustrative embodiments used to describe the invention generally address and solve the above-described problems and other problems related to communicating with remote processors or invoking computation on remote processors in multiprocessor environments. The illustrative embodiments of the invention provide a computer usable program product, and data processing system for fast remote communication and computation between processors.

The illustrative embodiments are described with respect to data, data structures, and identifiers only as examples. Such descriptions are not intended to be limiting on the invention. For example, an illustrative embodiment described with respect to one type of instruction may be implemented using a different instruction in a different configuration, in a similar manner within the scope of the invention. Generally, the invention is not limited to any particular message set that may be usable in a multiprocessor environment.

Furthermore, the illustrative embodiments may be implemented with respect to any type of data processing system. For example, an illustrative embodiment described with respect to a processor may be implemented in a multi-core processor or a multiprocessor system within the scope of the invention. As another example, an embodiment of the invention may be implemented with respect to any type of client system, server system, platform, or a combination thereof.

The illustrative embodiments are further described with respect to certain parameters, attributes, and configurations only as examples. Such descriptions are not intended to be limiting on the invention.

An implementation of an embodiment may take the form of data objects, code objects, encapsulated instructions, application fragments, distributed application or a portion thereof, drivers, routines, services, systems—including basic I/O system (BIOS), and other types of software implementations available in a data processing environment. For example, Java® Virtual Machine (JVM®), Java® object, an Enterprise Java Bean (EJB®), a servlet, or an applet may be manifestations of an application with respect to which, within which, or using which, the invention may be implemented. (Java, JVM, EJB, and other Java related terminologies are registered trademarks of Sun Microsystems, Inc. in the United States and other countries.)

An illustrative embodiment may be implemented in hardware, software, or a combination of hardware and software. The examples in this disclosure are used only for the clarity of the description and are not limiting on the illustrative embodiments. Additional or different information, data, operations, actions, tasks, activities, and manipulations will be conceivable from this disclosure for similar purpose and the same are contemplated within the scope of the illustrative embodiments.

The illustrative embodiments are described using specific code, data structures, files, file systems, logs, designs, architectures, layouts, schematics, and tools only as examples and are not limiting on the illustrative embodiments. Furthermore, the illustrative embodiments are described in some instances using particular data processing environments only as an example for the clarity of the description. The illustrative embodiments may be used in conjunction with other comparable or similarly purposed structures, systems, applications, or architectures.

Any advantages listed herein are only examples and are not intended to be limiting on the illustrative embodiments. Additional or different advantages may be realized by specific illustrative embodiments. Furthermore, a particular illustrative embodiment may have some, all, or none of the advantages listed above.

Figure 1:
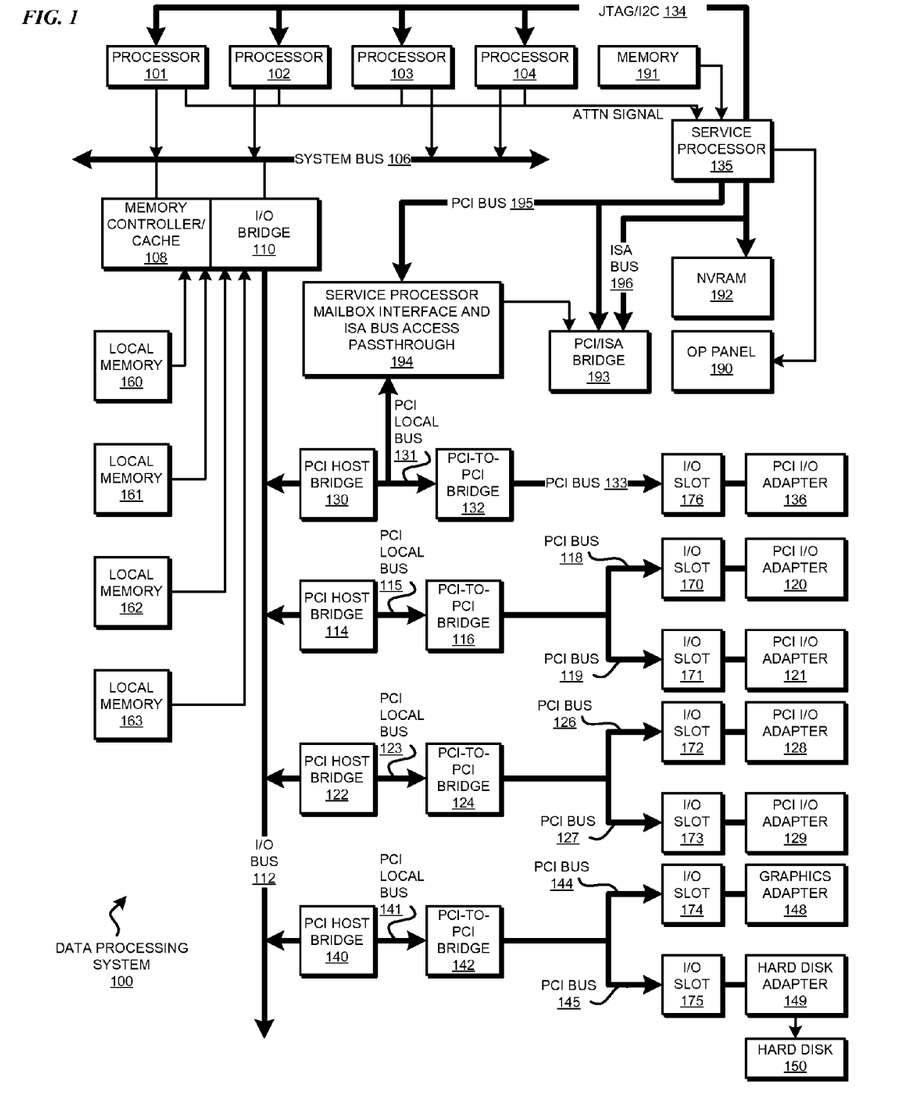
FIG. 1 depicts a block diagram of a data processing system in which the illustrative embodiments may be implemented is depicted.
Figure 2:
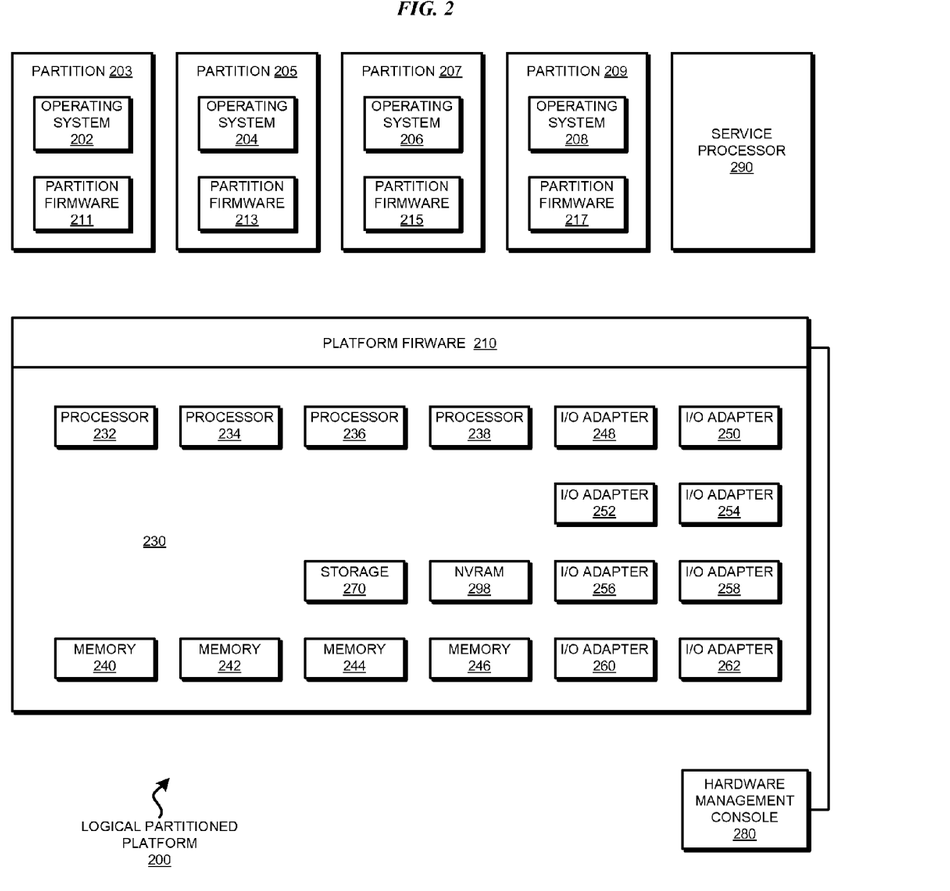
FIG. 2 depicts a block diagram of an example logical partitioned platform in which the illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

With reference to FIG. 1, this figure depicts a block diagram of a data processing system in which the illustrative embodiments may be implemented is depicted. Data processing system 100 may be a symmetric multiprocessor (SMP) system including a plurality of processors 101, 102, 103, and 104, which connect to system bus 106. For example, data processing system 100 may be an IBM Power System® implemented as a server within a network. (Power Systems is a product and a trademark of International Business Machines Corporation in the United States and other countries). Alternatively, a single processor system may be employed. Also connected to system bus 106 is memory controller/cache 108, which provides an interface to a plurality of local memories 160-163. I/O bus bridge 110 connects to system bus 106 and provides an interface to I/O bus 112. Memory controller/cache 108 and I/O bus bridge 110 may be integrated as depicted.

Data processing system 100 is a logical partitioned data processing system. Thus, data processing system 100 may have multiple heterogeneous operating systems (or multiple instances of a single operating system) running simultaneously. Each of these multiple operating systems may have any number of software programs executing within it. Data processing system 100 is logically partitioned such that different PCI I/O adapters 120-121, 128-129, and 136, graphics adapter 148, and hard disk adapter 149 may be assigned to different logical partitions. In this case, graphics adapter 148 connects for a display device (not shown), while hard disk adapter 149 connects to and controls hard disk 150.

Thus, for example, suppose data processing system 100 is divided into three logical partitions, P1, P2, and P3. Each of PCI I/O adapters 120-121, 128-129, 136, graphics adapter 148, hard disk adapter 149, each of host processors 101-104, and memory from local memories 160-163 is assigned to each of the three partitions. In these examples, memories 160-163 may take the form of dual in-line memory modules (DIMMs). DIMMs are not normally assigned on a per DIMM basis to partitions. Instead, a partition will get a portion of the overall memory seen by the platform. For example, processor 101, some portion of memory from local memories 160-163, and I/O adapters 120, 128, and 129 may be assigned to logical partition P1; processors 102-103, some portion of memory from local memories 160-163, and PCI I/O adapters 121 and 136 may be assigned to partition P2; and processor 104, some portion of memory from local memories 160-163, graphics adapter 148 and hard disk adapter 149 may be assigned to logical partition P3.

Each operating system executing within data processing system 100 is assigned to a different logical partition. Thus, each operating system executing within data processing system 100 may access only those I/O units that are within its logical partition. Thus, for example, one instance of the Advanced Interactive Executive (AIM operating system may be executing within partition P1, a second instance (image) of the AIX operating system may be executing within partition P2, and a Linux® or IBM-i® operating system may be operating within logical partition P3. (AIX and IBM-i are trademarks of International business Machines Corporation in the United States and other countries. Linux is a trademark of Linus Torvalds in the United States and other countries).

Peripheral component interconnect (PCI) host bridge 114 connected to I/O bus 112 provides an interface to PCI local bus 115. A number of PCI input/output adapters 120-121 connect to PCI local bus 115 through PCI-to-PCI bridge 116, PCI bus 118, PCI bus 119, I/O slot 170, and I/O slot 171. PCI-to-PCI bridge 116 provides an interface to PCI bus 118 and PCI bus 119. PCI I/O adapters 120 and 121 are placed into I/O slots 170 and 171, respectively. Typical PCI bus implementations support between four and eight I/O adapters (i.e. expansion slots for add-in connectors). Each PCI I/O adapter 120-121 provides an interface between data processing system 100 and input/output devices such as, for example, other network computers, which are clients to data processing system 100.

An additional PCI host bridge 122 provides an interface for an additional PCI local bus 123. PCI local bus 123 connects to a plurality of PCI I/O adapters 128-129. PCI I/O adapters 128-129 connect to PCI local bus 123 through PCI-to-PCI bridge 124, PCI bus 126, PCI bus 127, I/O slot 172, and I/O slot 173. PCI-to-PCI bridge 124 provides an interface to PCI bus 126 and PCI bus 127. PCI I/O adapters 128 and 129 are placed into I/O slots 172 and 173, respectively. In this manner, additional I/O devices, such as, for example, modems or network adapters may be supported through each of PCI I/O adapters 128-129. Consequently, data processing system 100 allows connections to multiple network computers.

A memory mapped graphics adapter 148 is inserted into I/O slot 174 and connects to I/O bus 112 through PCI bus 144, PCI-to-PCI bridge 142, PCI local bus 141, and PCI host bridge 140. Hard disk adapter 149 may be placed into I/O slot 175, which connects to PCI bus 145. In turn, this bus connects to PCI-to-PCI bridge 142, which connects to PCI host bridge 140 by PCI local bus 141.

A PCI host bridge 130 provides an interface for a PCI local bus 131 to connect to I/O bus 112. PCI I/O adapter 136 connects to I/O slot 176, which connects to PCI-to-PCI bridge 132 by PCI bus 133. PCI-to-PCI bridge 132 connects to PCI local bus 131. This PCI bus also connects PCI host bridge 130 to the service processor mailbox interface and ISA bus access pass-through logic 194 and PCI-to-PCI bridge 132.

Service processor mailbox interface and ISA bus access pass-through logic 194 forwards PCI accesses destined to the PCI/ISA bridge 193. NVRAM storage 192 connects to the ISA bus 196. Service processor 135 connects to service processor mailbox interface and ISA bus access pass-through logic 194 through its local PCI bus 195. Service processor 135 also connects to processors 101-104 via a plurality of JTAG/I2C busses 134. JTAG/I2C busses 134 are a combination of JTAG/scan busses (see IEEE 1149.1) and Phillips I2C busses.

However, alternatively, JTAG/I2C busses 134 may be replaced by only Phillips I2C busses or only JTAG/scan busses. All SP-ATTN signals of the host processors 101, 102, 103, and 104 connect together to an interrupt input signal of service processor 135. Service processor 135 has its own local memory 191 and has access to the hardware OP-panel 190.

When data processing system 100 is initially powered up, service processor 135 uses the JTAG/I2C busses 134 to interrogate the system (host) processors 101-104, memory controller/cache 108, and I/O bridge 110. At the completion of this step, service processor 135 has an inventory and topology understanding of data processing system 100. Service processor 135 also executes Built-In-Self-Tests (BISTs), Basic Assurance Tests (BATs), and memory tests on all elements found by interrogating the host processors 101-104, memory controller/cache 108, and I/O bridge 110. Any error information for failures detected during the BISTs, BATs, and memory tests are gathered and reported by service processor 135.

If a meaningful/valid configuration of system resources is still possible after taking out the elements found to be faulty during the BISTs, BATs, and memory tests, then data processing system 100 is allowed to proceed to load executable code into local (host) memories 160-163. Service processor 135 then releases host processors 101-104 for execution of the code loaded into local memory 160-163. While host processors 101-104 are executing code from respective operating systems within data processing system 100, service processor 135 enters a mode of monitoring and reporting errors. The type of items monitored by service processor 135 include, for example, the cooling fan speed and operation, thermal sensors, power supply regulators, and recoverable and non-recoverable errors reported by processors 101-104, local memories 160-163, and I/O bridge 110.

Service processor 135 saves and reports error information related to all the monitored items in data processing system 100. Service processor 135 also takes action based on the type of errors and defined thresholds. For example, service processor 135 may take note of excessive recoverable errors on a processor's cache memory and decide that this is predictive of a hard failure. Based on this determination, service processor 135 may mark that resource for deconfiguration during the current running session and future Initial Program Loads (IPLs). IPLs are also sometimes referred to as a "boot" or "bootstrap".

Data processing system 100 may be implemented using various commercially available computer systems. For example, data processing system 100 may be implemented using IBM Power Systems available from International Business Machines Corporation. Such a system may support logical partitioning using an AIX operating system, which is also available from International Business Machines Corporation.

Those of ordinary skill in the art will appreciate that the hardware depicted in FIG. 1 may vary. For example, other peripheral devices, such as optical disk drives and the like, also may be used in addition to or in place of the hardware depicted. The depicted example is not meant to imply architectural limitations with respect to the illustrative embodiments.

With reference to FIG. 2, this figure depicts a block diagram of an example logical partitioned platform in which the illustrative embodiments may be implemented. The hardware in logical partitioned platform 200 may be implemented as, for example, data processing system 100 in FIG. 1.

Logical partitioned platform 200 includes partitioned hardware 230, operating systems 202, 204, 206, 208, and platform firmware 210. A platform firmware, such as platform firmware 210, is also known as partition management firmware. Operating systems 202, 204, 206, and 208 may be multiple copies of a single operating system or multiple heterogeneous operating systems simultaneously run on logical partitioned platform 200. These operating systems may be implemented using IBM-i, which are designed to interface with a partition management firmware, such as Hypervisor. IBM-i is used only as an example in these illustrative embodiments. Of course, other types of operating systems, such as AIX and Linux, may be used depending on the particular implementation. Operating systems 202, 204, 206, and 208 are located in partitions 203, 205, 207, and 209.

Hypervisor software is an example of software that may be used to implement partition management firmware 210 and is available from International Business Machines Corporation. Firmware is "software" stored in a memory chip that holds its content without electrical power, such as, for example, read-only memory (ROM), programmable ROM (PROM), erasable programmable ROM (EPROM), electrically erasable programmable ROM (EEPROM), and non-volatile random access memory (nonvolatile RAM).

Additionally, these partitions also include partition firmware 211, 213, 215, and 217. Partition firmware 211, 213, 215, and 217 may be implemented using initial boot strap code, IEEE-1275 Standard Open Firmware, and runtime abstraction software (RTAS), which is available from International Business Machines Corporation. When partitions 203, 205, 207, and 209 are instantiated, a copy of boot strap code is loaded onto partitions 203, 205, 207, and 209 by platform firmware 210. Thereafter, control is transferred to the boot strap code with the boot strap code then loading the open firmware and RTAS. The processors associated or assigned to the partitions are then dispatched to the partition's memory to execute the partition firmware.

Partitioned hardware 230 includes a plurality of processors 232-238, a plurality of system memory units 240-246, a plurality of input/output (I/O) adapters 248-262, and a storage unit 270. Each of the processors 232-238, memory units 240-246, NVRAM storage 298, and I/O adapters 248-262 may be assigned to one of multiple partitions within logical partitioned platform 200, each of which corresponds to one of operating systems 202, 204, 206, and 208.

Partition management firmware 210 performs a number of functions and services for partitions 203, 205, 207, and 209 to create and enforce the partitioning of logical partitioned platform 200. Partition management firmware 210 is a firmware implemented virtual machine identical to the underlying hardware. Thus, partition management firmware 210 allows the simultaneous execution of independent OS images 202, 204, 206, and 208 by virtualizing all the hardware resources of logical partitioned platform 200.

Service processor 290 may be used to provide various services, such as processing of platform errors in the partitions. These services also may act as a service agent to report errors back to a vendor, such as International Business Machines Corporation. Operations of the different partitions may be controlled through a hardware management console, such as hardware management console 280. Hardware management console 280 is a separate data processing system from which a system administrator may perform various functions including reallocation of resources to different partitions.

The hardware in FIGS. 1-2 may vary depending on the implementation. Other internal hardware or peripheral devices, such as flash memory, equivalent non-volatile memory, or optical disk drives and the like, may be used in addition to or in place of certain hardware depicted in FIGS. 1-2. An implementation of the illustrative embodiments may also use alternative architecture for managing partitions without departing from the scope of the invention.

Figure 3:
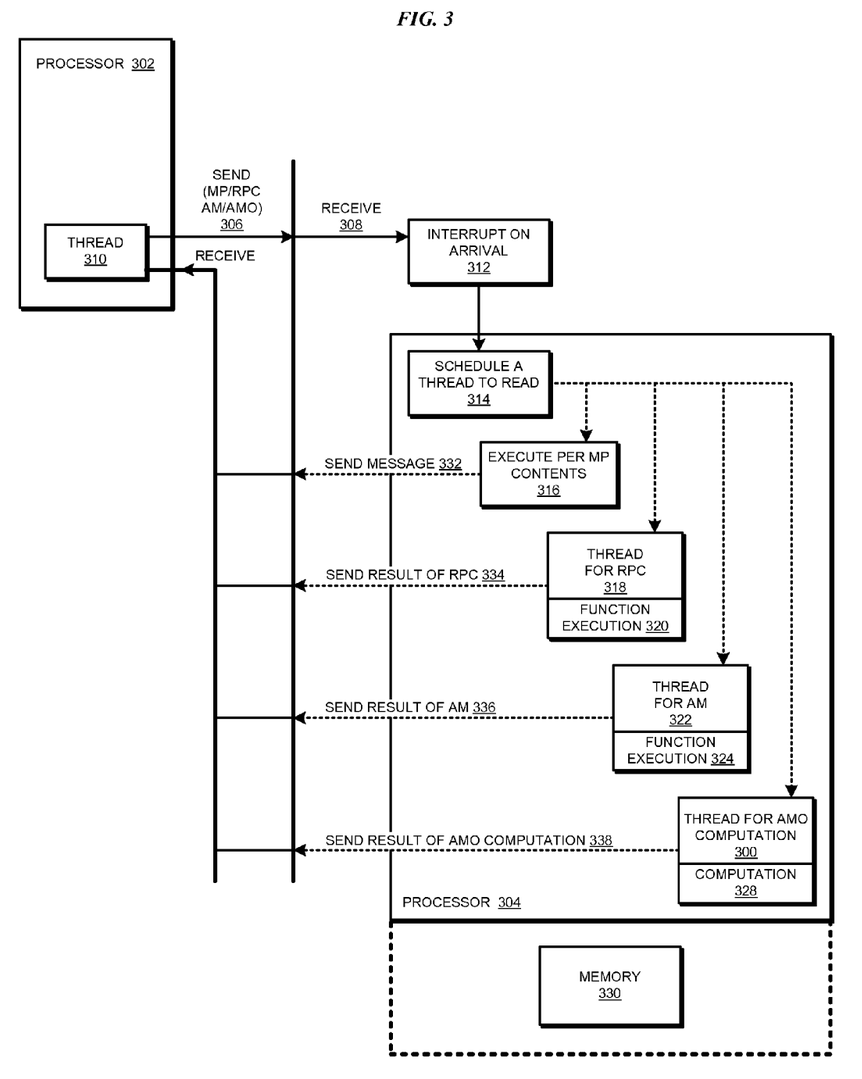
FIG. 3 depicts a block diagram of an example remote computing environment with respect to which an illustrative embodiment may be implemented.

With reference to FIG. 3, this figure depicts a block diagram of an example remote computing environment with respect to which an illustrative embodiment may be implemented. Processors 302 and 304 may each be implemented using any of processors 101-104 in FIG. 1. Processors 302 and 304 may be distinct processors or separate cores in a multi-core processor.

Processor 302 may send a message, a function call, or an operation for execution by performing send 306. A corresponding receive—receive 308—of the sent message, call, or operation occurs at processor 304.

When using MP, thread 310 (sender thread) on processor 302 (sending processor) may pass a message to cause another thread on processor 304 (remote processor) to execute a desired computation. In some cases, message passing may only be a transmission of data and may not include a request for remote computation.

When the message arrives on remote processor 304, the arrival is detected by polling or by interrupt 312. A receiving thread is scheduled 314 to read the message. The receiving thread executes at the schedule time to read the message. Based on the contents of the message, thread 316 (target thread) may perform a desired computation. Target thread 316 is woken up at the scheduled time and executed to perform the desired computation.

Presently used RPC method of communication with remote processors is different from MP in that the contents of the message include a function identifier and function parameters. With send 306 including RPC, steps 308, 312 and 314 are substantially as described above in terms of computing cost. In addition to the MP steps at remote processor 304 described above, RPC involves additional execution of having thread 318 locate the function using the function identifier and executing 320 the function using the supplied parameters. The function execution may utilize or spawn additional threads.

Presently used AM method of communication with remote processors is different from RPC in that the contents of the message involves a function call by including a pointer to the function to invoke and one or more function parameters. Cost incurred in processing an AM may also include cost of executing thread 322 for setting up the context in which the function will execute, resolving the pointer to the function, or otherwise handling the AM and then executing 324 the function.

AMO allows executing operations on a special-purpose processor associated with the memory controller on the home node of the data used in the operation. The computations 328 typically supported in an AMO are limited to a small set of special-purpose operations using thread 300, e.g., adding a scalar value to a single data point or attempting to acquire a lock or other singular operations or computations. In contrast, an embodiment of the invention is not limited to singular operations from the small set of special-purpose operations. Using an embodiment, any type of operation in any numerosity without limitation may be performed remotely.

Furthermore, the invention recognizes that in some, if not all, of the above methods, additional costs may be incurred. For example, upon completion of the computation on remote processor 304, send 332, 334, 336, or 338 for sending the results back to the sender thread in the sending processor may involve additional scheduling and executing costs.

Figure 4:
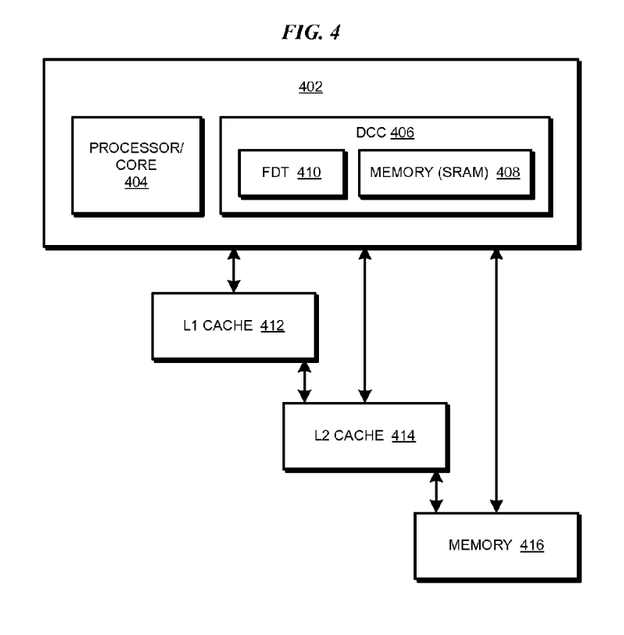
FIG. 4 depicts a block diagram of an example configuration for fast remote computation and communication between processors in accordance with an illustrative embodiment.

With reference to FIG. 4, this figure depicts a block diagram of an example configuration for fast remote computation and communication between processors in accordance with an illustrative embodiment. Data processing system 402 may include processor or core 404. Processor 404 may be similar to any of processors 302 or 304 in FIG. 3.

Direct core-to-core communication unit (DCC) 406 includes memory 408. In one embodiment, data may be written or extracted from in a first-in first-out (FIFO) manner. FIFO is only an example method of reading and writing data into memory 408 and is not intended to be limiting on the invention. For example, a processor may be allocated a specific slot of memory in which to write the data. For example, one processor may write data in the fifth position only and another processor may write first in the seventh position and then in the eight position in memory 408. In some implementations, memory 408 may be treated as a scratchpad without any particular organization. Generally, any method of ordering the reading and writing of data in memory 408 may be used in conjunction with an embodiment without limiting the invention. FIFO is chosen as an example method of operation of memory 408 and similar apparatus in other embodiments only for the clarity of the description and not as a limitation.

In one embodiment, memory 408 may be implemented using static random access memory (SRAM). In another embodiment memory 408 may be implemented using dynamic random access memory (DRAM).

FIFO description table (FDT) 410 manages the FIFO read/write in memory 408. FDT 410 may additionally enable triggering of computations on processor 404 using data from memory 408 as explained elsewhere in this disclosure. FDT 410 is only described as an example to correspond with the example of FIFO ordering. FDT 410 as a structure is not limiting on the invention. FDT 410 may be replaced with any suitable structure corresponding to the ordering method used with memory 408 within the scope of the invention.

Level 1 cache 412 (L1 cache), level 2 cache 414 (L2 cache), and memory 416 such as local memory 160 in FIG. 1, may be configured for use by processor 404 in any manner. In one embodiment, memory 408 may be a peer, to wit, at a comparable level of access, hierarchy, or speed, as L1 cache 412. In another embodiment, memory 408 may be superior, to wit, at a level of access, hierarchy, or speed higher compared to L1 cache 412. In another embodiment, memory 408 may be at a hierarchical level comparable to L2 cache 414. Although possible to make memory 408 comparable to memory 416, such configurations may not operate at sufficient speed or cost as to realize an advantage of the invention.

Figure 5:
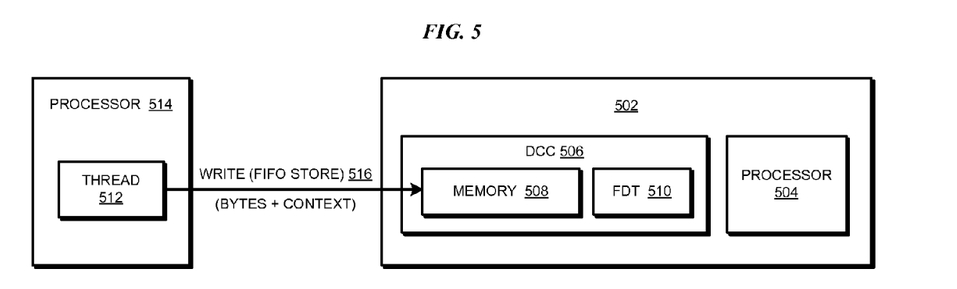
FIG. 5 depicts a block diagram of one part of performing fast remote communication and computation between processors in accordance with an illustrative embodiment.

With reference to FIG. 5, this figure depicts a block diagram of one part of performing fast remote communication and computation between processors in accordance with an illustrative embodiment. Data processing system 502 may be similar to data processing system 402 in FIG. 4.

Processor 504, DCC 506, memory 508, and FDT 510 may be similar to their corresponding artifacts in FIG. 4. An area of memory 508 may be allocated as global address space in which data may be written or read using a global address. Furthermore, in one embodiment, such an area may be contiguous in memory 508.

Processor 504 may be a remote processor on which thread 512 executing on processor 514 may wish to perform an operation. An embodiment may provide special load and store instructions for reading from or writing to memory 508 in FIFO mode. Using such a store instruction, thread 512 may perform write 516 by executing a FIFO store with respect to memory 508.

The FIFO store instruction of write 516 may store into memory 508 a certain number of bytes, which include context information. For example, thread 512 may form data that is sufficient to cause the execution of the desired operation at processor 504. The bytes corresponding to the data written in write 516 may include one or more bytes of information that encode the context or address space to be used for executing the operation at processor 504. Further, the bytes corresponding to the data written in write 516 may include one or more bytes of data that contain instructions to execute on processor 504, the address of a function to execute on processor 504, or a function identifier that indicates an operation to invoke on processor 504. Further, the bytes corresponding to the data written in write 516 may include one or more bytes of parameters that are to be used with the operation in a specified context.

The total number of bytes in write (FIFO store) 516 is determined at processor 514. The effective address of the bytes in thread 512's context (sender's effective address) is translated to or associated with a global address reachable by processes executing at either processor 504 or processor 514. For example, the global address associated with the sender's effective address may be in the area of memory 508 that has been allocated as global address space.

The bytes of write (FIFO store) 516 are then written to that global address in memory 508. An entry in FDT 510 is made relating to the bytes being written into memory 508.

Figure 6:
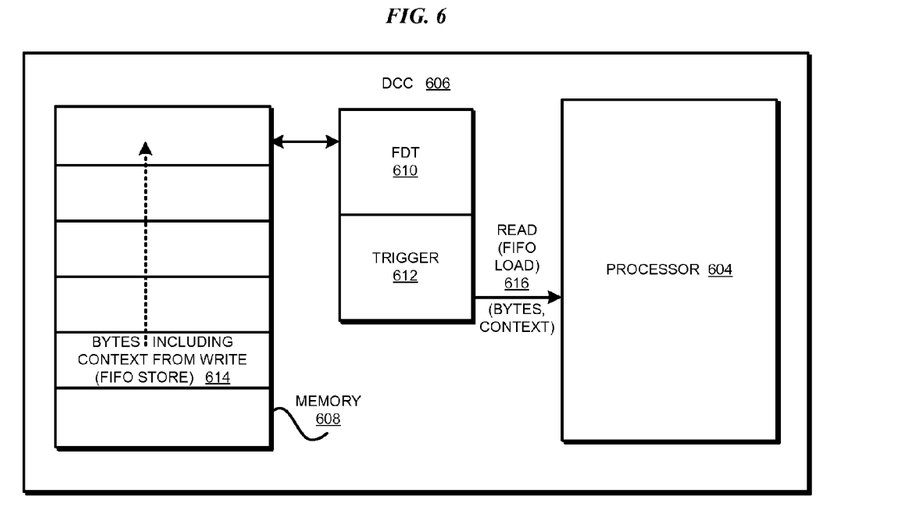
FIG. 6 depicts a block diagram of another part of performing fast remote communication and computation between processors in accordance with an illustrative embodiment.

With reference to FIG. 6, this figure depicts a block diagram of another part of performing fast remote communication and computation between processors in accordance with an illustrative embodiment. Processor 604, DCC 606, memory 608, and FDT 610 may be similar to their corresponding artifacts in FIG. 6.

Trigger 612 may be a triggering mechanism to initiate execution of an instruction on processor 604. In one embodiment, trigger 612 may be implemented in hardware.

Bytes 614 may be bytes including a context as may be written by write (FIFO store) 516 in FIG. 5. Bytes 614 may be written in the order they are received at memory 608 operating as a FIFO queue. Bytes 614 may progressively move higher in the FIFO queue logical order, eventually to occupy the first logical position in the FIFO queue.

FDT 610 may determine whether certain bytes in the FIFO queue in memory 608 are ready to be executed. For example, bytes not in the first position in the FIFO queue are not ready to be executed. As another example, bytes that have not been written completely at the time of checking are not ready to be executed. For example, the size or number of bytes from a certain global address may indicate that 64 bytes should be found or used from that address but only 32 bytes may be present at the time of checking.

FDT 610 may determine that the bytes in the first position in the FIFO queue, such as bytes 614 having progressed to the first position, are ready to be executed. Using trigger 612, those bytes may be read (FIFO load) 616, or loaded into processor 604 for execution. Recall that the bytes include the proper context within which to execute the instruction in those bytes. As an example, at or before loading the bytes, FDT 610 may load the context information sent as part of write 516 in FIG. 5 to appropriate registers in processor 604 so that addresses presented in that message are made to correspond to effective addresses usable by a thread in processor 604. These addresses may be used to encode the location of instructions to be executed as part of the requested operation. These addresses may also be used to encode the location of parameters to the function to be performed on processor 604.

According to an embodiment, the arrival of the bytes at DCC 606 can automatically kick off computation at remote processor 604 in this manner. Remote computation and communication using the FIFO store, including triggering operation and loading the appropriate context on remote processor 604, is substantially faster than any of the existing methods described in FIG. 3 or their variants. The overall cost of remote computation and communication in this manner is also significantly below the overall cost of any of the existing methods described in FIG. 3 or their variants.

The bytes sent from a sending processor to a remote processor can include an instruction according to any convention. For example, in one embodiment the instruction may resemble RPC and may include (optionally) a function identifier, a set of parameters for the function, and a context. A set of parameters is zero or more parameters.

In another embodiment, the instruction may resemble RPC but may indirectly imply the destination (the remote processor). For example, in place of a remote processor identifier, the embodiment may identify the DCC of the remote processor, the memory of the DCC of the remote processor, or an address space within the memory of the DCC of the remote processor. Any other indirect or implicit identification of the destination where the instruction should execute may be used in conjunction with an embodiment within the scope of the invention.

In another embodiment, the instruction may resemble AM and may include (optionally) a remote processor identifier, a function code, a set of parameters for the function, and a context. In another embodiment, the instruction may resemble AM but may indirectly imply the destination in any manner, including but not limited to those described above as examples.

Other embodiments may encode the instruction to resemble any method of remote computation, including but not limited to any presently used method or specification. Such encoded instructions are going to be apparent from this disclosure to those of ordinary skill in the art and are contemplated within the scope of the invention.

Furthermore, the process of executing the instruction from the memory in the DCC can be accomplished in a variety of ways without limitation on the invention. For example, in one embodiment, an existing thread may be woken up to perform the instruction or invoke the function included therein. In another example embodiment, a new thread may be created to perform the instruction. In another embodiment, a hardware thread may be utilized to perform the instruction.

Additionally, the instruction (or the function therein) to be executed may be executed in a variety of ways without limitation on the invention. For example, in one embodiment, a function may be executed by performing a function table lookup and jumping to the function address found in the corresponding table entry. In another example embodiment, the function may be executed by jumping to a specified address. In another example, the contents of the message sent may include a set of binary (executable) instructions which are themselves executed by a thread on the remote processor. The result of executing the bytes sent from the sending processor may be returned from the remote processor in any manner suitable for a given implementation without departing the scope of the invention.

Other factors, such as power conservation may be included in the performance of fast remote communication and computation between processors according to an embodiment. For example, a remote processor, or another component utilized by the remote processor for computing according to the bytes sent from a sending processor, may hibernate, power down, go to a sleep mode, or otherwise exist in a power conservation mode at a given time. As a part of operating an embodiment, the remote processor or another component may be woken up at a suitable time to execute the requested operation. For example, a remote processor or another component may be woken up at the arrival of the message (bytes) into a DCC's memory. The wake-up process may be automatic, periodic, event-based, or performed in any other way suitable for an implementation within the scope of the invention.

Furthermore, an embodiment may allow a runtime environment or an operating system, at the sending processor, the remote processor, or both processors to operate as they presently do after an initial configuration according to an embodiment. For example, in one embodiment, a processor may be configured to be able to send a remote operation request to a second processor's DCC memory but not to a third processor's DCC memory. In another example embodiment, all or a subset of processors in a given data processing environment may be configured with the ability to write to each other's DCC memories. In another example embodiment, a processor and any other processors related to that processor in some way (a first gang of processors) may be configured to write to one or more remote processors in a remote gang of processors.

In an example embodiment, the address spaces associated with various processors may be enabled for reading, writing, or execution by distant processors, instead of or in addition to associating processors with each other as described above. In yet another example embodiment, controlled portions of the address spaces may be enabled for reading, writing, or execution by distant processors. Access control to such address spaces may be implemented at any level suitable for a particular implementation. For example, one implementation of access control may enable writing to any available address within reach of the processor or DCC. In another implementation, certain address spaces may be reserved or demarcated for such remote communications. Access control with other granularities may be more suitable for other implementations.

These examples of establishing trust between processors or memories for operating an embodiment are not intended to be limiting on the invention. For enabling an embodiment, any type of trust relationship may be established between processors, memories, data processing systems, or other components within the scope of the invention.

Furthermore, a trust relationship may be pre-created and may last for a period of time. A trust relationship may also be created on demand and may last only for a specific operation, such as for sending one or more communications. A trust relationship may be created directly between two processors, or may be inferred from other trust relationships of a processor.

In another embodiment, a remote processor may allocate registers, threads, or other computing resources for executing the bytes sent using an embodiment in any manner suitable to the particular processor's configuration. For example, a resource may be allocated from a shared pool of that resource or a pool of that resource dedicated for operating an embodiment of the invention.

Figure 7:
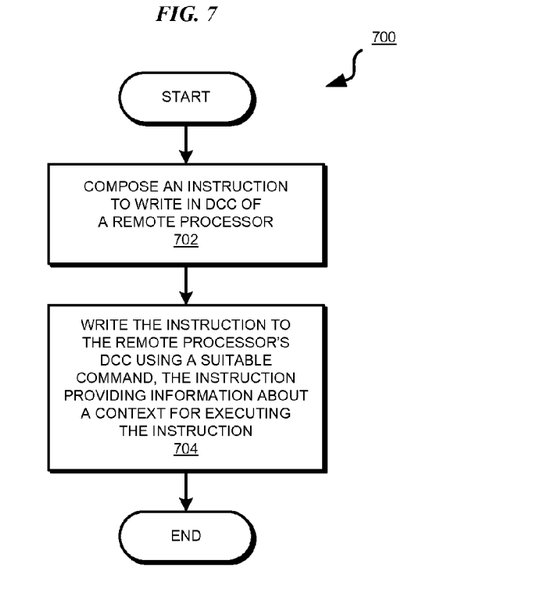
FIG. 7 depicts a flowchart of an example process for a part of fast remote communication and computation between processors in accordance with an illustrative embodiment.

With reference to FIG. 7, this figure depicts a flowchart of an example process for a part of fast remote communication and computation between processors in accordance with an illustrative embodiment. Process 700 may be implemented in the code of a thread, such as thread 512 in FIG. 5.

Process 700 begins by composing an instruction to write in a DCC of a remote processor (step 702). The instruction may be a set of bytes formed in any manner described or suggested within the scope of the invention as described above. A set of bytes is one or more bytes. Process 700 may accomplish step 702, for example, by writing the necessary data, such as function pointer, context, and parameters, to a local buffer.

Process 700 writes the instruction to the remote processor's DCC using a suitable command, such as the FIFO send instruction (step 704). The instruction being written includes information about a context for executing the instruction. Process 700 ends thereafter.

Figure 8:
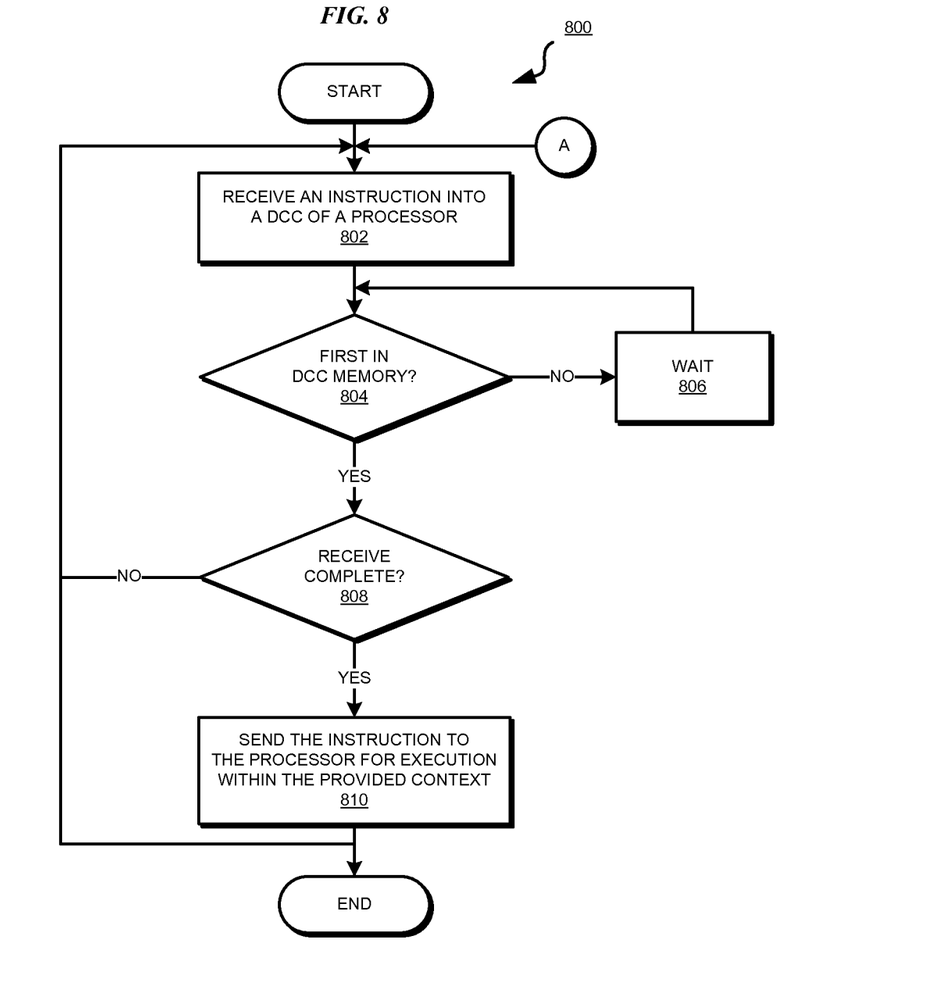
FIG. 8 depicts a flowchart of an example process for another part of fast remote communication and computation between processors in accordance with an illustrative embodiment.

With reference to FIG. 8, this figure depicts a flowchart of an example process for another part of fast remote communication and computation between processors in accordance with an illustrative embodiment. Process 800 may be implemented in a DCC, such as DCC 606 in FIG. 6.

Process 800 begins by receiving an instruction (the bytes as described with respect to FIGS. 5 and 6) into a DCC of a (remote) processor (step 802). Another process may enter process 800 at the entry point marked "A".

Process 800 determines whether the instruction of step 802 is at the head of the logical FIFO queue stored in the DCC memory (step 804). If the instruction is not at the head of the FIFO queue (the "No" path of step 804), process 800 may wait or otherwise allow an interval to elapse (step 806). Process 800 then returns to step 804.

If the instruction of step 802 is at the head of the FIFO queue (the "Yes" path of step 804), process 800 determines whether the instruction is complete, or in other words, whether the instruction is not blocked in any way (step 808). If the instruction is not complete or the instruction is blocked (the "No" path of step 808), process 800 returns to step 802. Otherwise (the "Yes" path of step 808), process 800 sends the instruction to the processor for execution within the provided context (step 810). Process 800 may end thereafter or return to step 802 to operate on the next instruction in the FIFO queue.

In contrast with the prior art methods, sending instructions for execution in this manner cause an operation encoded within the instructions to be invoked without requiring the help of software threads. The invocation occurs within a hardware execution context using data specified in the instruction at the remote processor. The hardware execution context is the context corresponding to the context information included with the instruction. Once the operation is invoked within the hardware execution context, software threads may be executed to perform communications, I/O, or other manipulations as may be needed by the operation.

Figure 9:
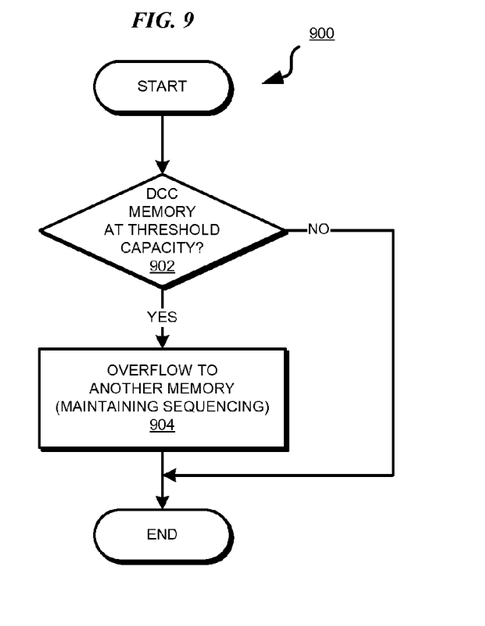
FIG. 9 depicts a flowchart of an example process for managing the volume of fast remote communication and computation between processors in accordance with an illustrative embodiment.

With reference to FIG. 9, this figure depicts a flowchart of an example process for managing the volume of fast remote communication and computation between processors in accordance with an illustrative embodiment. Process 900 may be implemented in a DCC, such as DCC 606 in FIG. 6.

Process 900 begins by determining whether usage of a memory associated with DCC for maintaining the FIFO queue according to an embodiment has reached a threshold capacity (step 902). If the memory usage has not reached the threshold (the "No" path of step 902), process 900 ends thereafter. Otherwise (the "Yes' path of step 902), process 900 overflows the FIFO queue to another memory while maintaining the sequencing of the various instructions stored in the FIFO queue (step 904). Process 900 ends thereafter.

For overflowing to another memory, process 900 may allocate and configure a region of a memory for use as a FIFO queue in accordance with an embodiment (not shown). Furthermore, the overflow space may be allocated and configured in a memory different from the memory associated with the DCC, such as memory 608 in FIG. 6. As an example, the overflow memory may be a peer of L2 cache or a portion of main memory.

Figure 10:
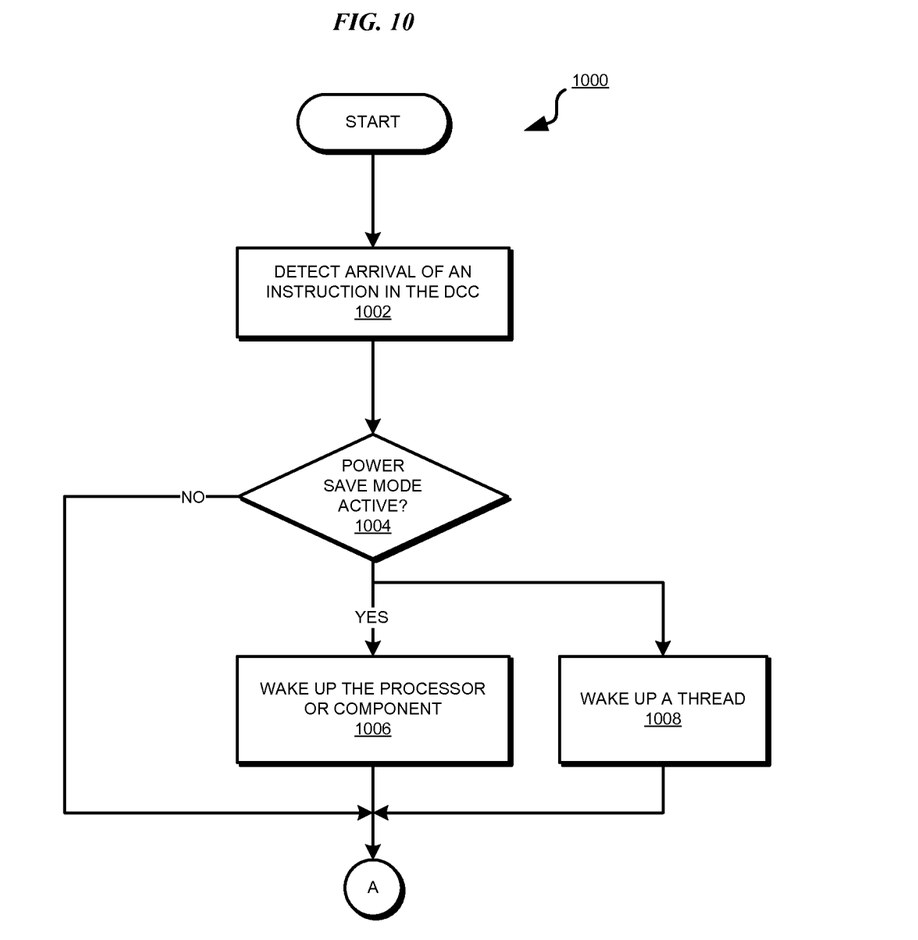
FIG. 10 depicts a flowchart of an example process for another part of fast remote communication and computation between processors in accordance with an illustrative embodiment.

With reference to FIG. 10, this figure depicts a flowchart of an example process for another part of fast remote communication and computation between processors in accordance with an illustrative embodiment. Process 1000 may be implemented in a DCC, such as DCC 606 in FIG. 6.

Process 1000 begins by detecting the arrival of (the bytes of) an operation in the DCC of a remote processor (step 1002). The operation arriving in step 1002 may be a DCC message containing information regarding an operation to be performed at the associated processor. The operation may be encoded in any manner suitable for a given implementation.

Process 1000 determines whether a power save mode is active (step 1004). If a power save mode is not active (the "No" path of step 1004), process 1000 exits at the exit point marked "A" and enters another process with a corresponding entry point marked "A" in FIG. 8.

Otherwise (the "Yes" path of step 1004), process 1000 wakes up the remote processor or a component associated therewith (step 1006). Process 1000 may additionally or alternatively wake up a thread as a part of returning from a power save mode (step 1008). Process 1000 exits at the exit point marked "A" and enters another process with a corresponding entry point marked "A" in FIG. 8.

Figure 11:
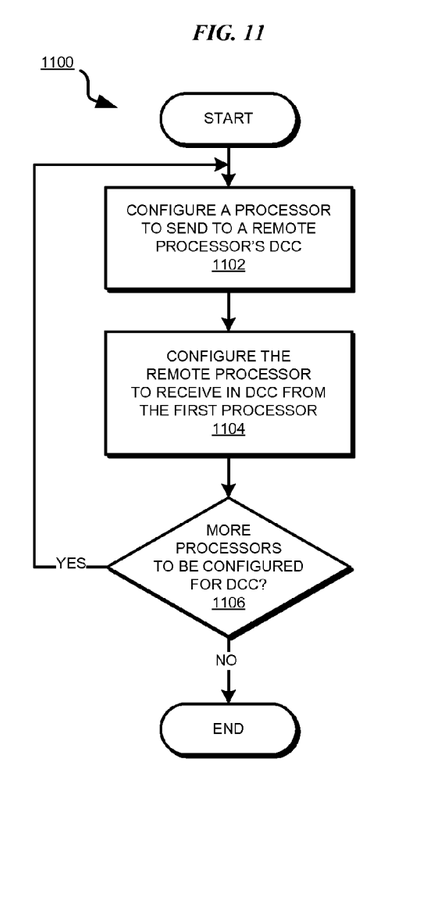
FIG. 11 depicts a flowchart of an example process for configuring fast remote communication and computation between processors in accordance with an illustrative embodiment.

With reference to FIG. 11, this figure depicts a flowchart of an example process for configuring fast remote communication and computation between processors in accordance with an illustrative embodiment. Process 1100 may be implemented in an operating system or another application executing on a data processing system that includes a sending processor and a receiving processor, such as data processing system 502 in FIG. 5.

Process 1100 begins by configuring a sending processor to be able to send messages, instructions, or commands to a remote receiving processor's DCC (step 1102). Process 1100 or an equivalent process executing on the remote receiving processor's data processing system may configure the remote processor to receive messages, instructions or commands into the DCC from the sender of step 1102 (step 1104). Optionally, Process 1100 may determine whether the sending process should be allowed to initiate remote communication or computation with the receiving process, and opt not to establish a connection if permissions checks indicate that the sender should not be allowed to perform the requested remote operation.

Process 1100 determines whether more processors are to be configured for writing to remote DCC (step 1106). If more processors are to be configured (the "Yes" path of step 1106), process 1100 returns to step 1102. Otherwise (the "No" path of step 1106), process 1106 ends thereafter.

The components in the block diagrams and the steps in the flowcharts described above are described only as examples. The components and the steps have been selected for the clarity of the description and are not limiting on the illustrative embodiments of the invention. For example, a particular implementation may combine, omit, further subdivide, modify, augment, reduce, or implement alternatively, any of the components or steps without departing from the scope of the illustrative embodiments. Furthermore, the steps of the processes described above may be performed in a different order within the scope of the invention.

Thus, an apparatus, and computer program product are provided in the illustrative embodiments for fast remote communication and computation between processors. Using an embodiment of the invention, a data processing environment may be able to synchronize operations between two or more processors. Remote updates may be executed in-place at remote processors by using an embodiment. An embodiment may allow executing operations over a range of remote addresses.

An embodiment may also enable efficient remote execution of short functions that do not consume a significant number of cycles. Additionally, an embodiment may enable the execution of short functions without using interrupts, polling, or thread scheduling, or with reduced cost of interrupts or scheduling.

The invention can take the form of an embodiment containing both hardware and software elements. In a preferred embodiment, the invention is implemented in software or program code, which includes but is not limited to firmware, resident software, and microcode.

Furthermore, the invention can take the form of a computer program product accessible from a computer-usable or computer-readable medium providing program code for use by or in connection with a computer or any instruction execution system. For the purposes of this description, a computer-usable or computer-readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include compact disk-read only memory (CD-ROM), compact disk-read/write (CD-R/W) and DVD.

Further, a computer storage medium may contain or store a computer-readable program code such that when the computer-readable program code is executed on a computer, the execution of this computer-readable program code causes the computer to transmit another computer-readable program code over a communications link. This communications link may use a medium that is, for example without limitation, physical or wireless.

A data processing system suitable for storing and/or executing program code will include at least one processor coupled directly or indirectly to memory elements through a system bus. The memory elements can include local memory employed during actual execution of the program code, bulk storage media, and cache memories, which provide temporary storage of at least some program code in order to reduce the number of times code must be retrieved from bulk storage media during execution.

A data processing system may act as a server data processing system or a client data processing system. Server and client data processing systems may include data storage media that are computer usable, such as being computer readable. A data storage medium associated with a server data processing system may contain computer usable code. A client data processing system may download that computer usable code, such as for storing on a data storage medium associated with the client data processing system, or for using in the client data processing system. The server data processing system may similarly upload computer usable code from the client data processing system. The computer usable code resulting from a computer usable program product embodiment of the illustrative embodiments may be uploaded or downloaded using server and client data processing systems in this manner.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to explain the principles of the invention, the practical application, and to enable others of ordinary skill in the art to understand the invention for various embodiments with various modifications as are suited to the particular use contemplated.

What is claimed is:

1. An apparatus for fast remote communication and computation between processors, comprising:
    a first processor in a multiprocessor data processing system, the first processor being a remote processor;
    a direct core to core communication unit (DCC) configured to operate with the remote processor; and
    a memory associated with the DCC,
        wherein the memory operates at a hierarchical level of one of (i) level-1 of a processor-cache and (ii) level-2 of the processor-cache in a cache hierarchy of the remote processor,
        wherein a first area of the memory is configured as a first address space accessible only to the remote processor and a second area of the memory is configured as a second address space accessible by a second processor in the multiprocessor data processing system,
        wherein the second processor gains access to the second area of the memory using an address from the second address space, the memory receiving from the second processor a set of bytes in the second area at the address from the second address space, the set of bytes comprising (i) an operation to be performed at the remote processor and (ii) a context for the operation, wherein the context comprises an encoded reference to an address space of the second processor wherein the reference is used in executing the operation at the remote processor, and
        wherein the remote processor executes an operation using the context.

2. The apparatus of claim 1, wherein the encoded reference comprises an effective address in an address space of the second processor.

3. The apparatus of claim 1, wherein the context is a hardware execution context that is created by the remote processor without software intervention.

4. The apparatus of claim 1, wherein the remote processor executes the set of bytes responsive to loading the bytes using a load instruction, wherein the load instruction loads the set of bytes at the remote processor for computation thereby omitting execution of at least one thread for reading the contents of the set of bytes and omitting execution of at least one thread for executing the contents of the set of bytes.

5. The apparatus of claim 1, wherein the remote processor executes the set of bytes responsive to loading the bytes using an instruction that loads the set of bytes at the remote processor for computation without requiring sending an interrupt to the remote processor.

6. The apparatus of claim 1, wherein the remote processor executes the set of bytes responsive to the set of bytes occupying a first logical position in a FIFO queue in the memory.

7. The apparatus of claim 1, wherein the remote processor executes the set of bytes responsive to the set of bytes not being blocked from execution.

8. The apparatus of claim 1, wherein the set of bytes are sent by a thread executing on the second processor.

9. The apparatus of claim 1, wherein the memory is a static random access memory (SRAM).

10. The apparatus of claim 1, wherein the memory is configured to store a plurality of sets of bytes in a first-in first-out (FIFO) queue.

11. The apparatus of claim 1, further comprising:
    a first configuration enabling the second processor to write to the memory of the DCC of the remote processor; and
    a second configuration configuring the remote processor to allow the second processor to write to the memory of the DCC of the remote processor.

12. The apparatus of claim 1, wherein arrival of the set of bytes in the memory triggers the executing without an interrupt being sent to the remote processor.

13. A computer usable program product comprising a computer usable hardware storage device including computer usable code for fast remote communication and computation between processors, wherein the computer usable code upon execution by a hardware processor causes:
    configuring a direct core to core communication unit (DCC) to operate with the processor, the processor being a remote processor;
    configuring a first area of a memory associated with the DCC as a first address space accessible only to the remote processor and configuring a second area of the memory as a second address space accessible by a second processor in the multiprocessor data processing system, wherein the memory operates at a hierarchical level of one of (i) level-1 of a processor-cache and (ii) level-2 of the processor-cache in a cache hierarchy of the remote processor, wherein the second processor gains access to the second area of the memory using an address from the second address space;
    receiving, from the second processor, at the address from the second address space in the second area of the memory, a set of bytes, the set of bytes comprising (i) an operation to be performed at the remote processor and (ii) a context for the operation, wherein the context comprises an encoded reference to an address space of the second processor wherein the reference is used in executing the operation at the remote processor; and
    executing the operation at the remote processor using the context.

14. The computer usable program product of claim 13, wherein the encoded reference comprises an effective address in an address space of the second processor.

15. The computer usable program product of claim 13, wherein the context is a hardware execution context that is created by the remote processor without software intervention.

16. The computer usable program product of claim 13, wherein executing the set of bytes comprises:

loading the bytes using a load instruction, wherein the load instruction loads the set of bytes at the remote processor for computation thereby omitting execution of at least one thread for reading the contents of the set of bytes and omitting execution of at least one thread for executing the contents of the set of bytes.

17. The computer usable program product of claim 13, wherein executing the set of bytes further comprises:
loading the bytes using an instruction that loads the set of bytes at the remote processor for computation without requiring sending an interrupt to the remote processor.

18. The computer usable program product of claim 13, further comprising:
assessing whether the set of bytes is the first in a FIFO queue in the memory, wherein the executing is responsive to the assessing being affirmative.

19. The computer usable program product of claim 13, further comprising:
assessing whether the set of bytes is blocked from execution, wherein the executing is responsive to the assessing being negative.

20. The computer usable program product of claim 13, wherein the set of bytes are sent by a thread executing on the second processor.

21. The computer usable program product of claim 20, further comprising:
composing, using the thread, the set of bytes; and
writing the set of bytes directly to the memory of the DCC of the remote processor.

\* \* \* \* \*